(12) United States Patent
Cheng

(10) Patent No.: US 10,381,830 B2
(45) Date of Patent: Aug. 13, 2019

(54) MULTI-TERMINAL DC ELECTRICAL NETWORK

(71) Applicant: General Electric Technology GmbH, Baden (CH)

(72) Inventor: Leong Ching Cheng, Birmingham (GB)

(73) Assignee: General Electric Technology GmbH, Baden (CH)

( * ) Notice: Subject to any disclaimer, the term of this patent is extended or adjusted under 35 U.S.C. 154(b) by 583 days.

(21) Appl. No.: 15/111,743

(22) PCT Filed: Jan. 16, 2015

(86) PCT No.: PCT/EP2015/050810
§ 371 (c)(1),
(2) Date: Jul. 14, 2016

(87) PCT Pub. No.: WO2015/107167
PCT Pub. Date: Jul. 23, 2015

(65) Prior Publication Data
US 2016/0336746 A1    Nov. 17, 2016

(30) Foreign Application Priority Data
Jan. 17, 2014 (EP) .................... 14275011

(51) Int. Cl.
*H02J 1/00* (2006.01)
*H02J 3/00* (2006.01)
(Continued)

(52) U.S. Cl.
CPC  *H02J 1/12* (2013.01); *H02J 1/14* (2013.01); *H02J 3/36* (2013.01); *Y02E 60/60* (2013.01)

(58) Field of Classification Search
CPC ...... H02J 1/102; H02J 3/36; H02J 1/10; H02J 1/08; H02J 3/382; H02M 7/7575; H02M 5/447; H02M 5/458; H02H 7/268
(Continued)

(56) References Cited

U.S. PATENT DOCUMENTS

2012/0092904 A1   4/2012 Nuqui et al.
2013/0197704 A1   8/2013 Pan et al.
(Continued)

FOREIGN PATENT DOCUMENTS

CN    102522765 A    6/2012
CN    103138279 A    6/2013
(Continued)

OTHER PUBLICATIONS

English-language machine translation of CN 102522765, Hehai University (Jun. 27, 2012).
(Continued)

*Primary Examiner* — Anh Q Tra
(74) *Attorney, Agent, or Firm* — Eversheds Sutherland (US) LLP

(57) ABSTRACT

A multi-terminal DC electrical network comprises a plurality of DC terminals, each DC terminal operatively connected to at least one other DC terminal via a respective DC power transmission medium; a plurality of converters, each converter being operatively connected to a respective one of the DC terminals, the plurality of converters including at least one designated converter; and a controller including a solver configured to use an algorithm to process a plurality of values to compute a no-load DC voltage for a first designated converter as a function of the plurality of values. The plurality of values include a first value defining an operating mode of each designated converter; a second value defining a default electrical characteristic of the multi-terminal DC (Continued)

electrical network or a computation parameter of the algorithm; and a third value defining an electrical measurement corresponding to a voltage or current in the multi-terminal DC electrical network.

18 Claims, 5 Drawing Sheets

(51) Int. Cl.
    *H02J 1/12* (2006.01)
    *H02J 3/36* (2006.01)
    *H02J 1/14* (2006.01)

(58) Field of Classification Search
    USPC .............................................. 307/82; 363/35
    See application file for complete search history.

(56) References Cited

U.S. PATENT DOCUMENTS

| | | | | |
|---|---|---|---|---|
| 2015/0116876 | A1* | 4/2015 | Whitehouse | H02H 3/06 361/66 |
| 2015/0134132 | A1* | 5/2015 | Feng | H02J 4/00 700/286 |
| 2016/0254669 | A1* | 9/2016 | Zhang | B33Y 30/00 363/35 |

FOREIGN PATENT DOCUMENTS

| | | |
|---|---|---|
| EP | 1 069 666 A1 | 1/2001 |
| WO | WO 2008/000626 A1 | 1/2008 |
| WO | WO 2009/152840 A1 | 12/2009 |
| WO | WO 2012/000548 A1 | 1/2012 |
| WO | WO 2012/000549 A1 | 1/2012 |

OTHER PUBLICATIONS

English-language machine translation of CN 103138279, Shenyang University of Technology (Jun. 5, 2013).

Johnson, B.K., et al., "Expandable multiterminal DC systems based on voltage droop," IEEE Transactions on Power Delivery, vol. 8, No. 4, New York, New York, pp. 1926-1932 (Oct. 31, 1993).

Lie, Xu, et al., "DC grid management of a multi-terminal HVDC transmission system for large offshore wind farms," 2009 International Conference on Sustainable Power Generation and Supply, Piscataway, New Jersey, pp. 1-7 (Apr. 6, 2009).

International Search Report and Written Opinion, PCT/EP2015/050810, Alstom Technology Ltd., 13 pages (dated Apr. 28, 2015).

* cited by examiner

MULTI-TERMINAL DC ELECTRICAL NETWORK

CROSS-REFERENCE TO RELATED APPLICATIONS

The present application is a National Stage of International Application No. PCT/EP2015/050810, filed Jan. 16, 2015, which claims the benefit of and priority to European Application No. 14275011, filed Jan. 17, 2014, which is incorporated herein by reference in its entirety.

This invention relates to a multi-terminal DC electrical network, and a method of controlling power flow in a multi-terminal DC electrical network.

A new class of high voltage direct current (HVDC) power transmission networks are being considered for moving large quantities of power over long distances, as required by geographically dispersed renewable forms of generation, and to augment existing capabilities of AC and DC power transmission networks with smartgrid intelligence and features that are able to support modern electricity trading requirements. Such a network is sometimes referred to as a DC power grid.

A DC power grid requires multi-terminal interconnection of HVDC converters, whereby power can be exchanged on the DC side using three or more HVDC converters operating in parallel. Each HVDC converter acts as either a source or sink to maintain the overall input-to-output power balance of the network whilst exchanging the power as required. Such interconnection is carried out using DC power transmission media to interconnect different terminals of the DC power grid.

A DC power transmission medium may be any medium that is capable of transmitting electrical power between two or more DC terminals. Such a medium may be, but is not limited to, a submarine DC power transmission cable, an overhead DC power transmission line, or a combination of an overhead DC power transmission line and an underground DC power transmission cable.

According to a first aspect of the invention, there is provided a multi-terminal DC electrical network comprising:
- a plurality of DC terminals, each DC terminal being operatively connected to at least one other DC terminal via a respective DC power transmission medium;
- a plurality of converters, each converter being operatively connected to a respective one of the DC terminals, the plurality of converters including at least one designated converter; and
- a controller including a solver configured to use an algorithm to process a plurality of values to thereby compute a no-load DC voltage for at least one first designated converter as a function of a plurality of values, the plurality of values including:
  - at least one first value defining an operating mode of the or each designated converter;
  - at least one second value defining a default electrical characteristic of the multi-terminal DC electrical network or a computation parameter of the algorithm; and
  - at least one third value defining an electrical measurement corresponding to a voltage or current in the multi-terminal DC electrical network,
- wherein the controller is configured to operate the or each first designated converter in accordance with the or the respective computed no-load DC voltage.

It will be understood that, for the purposes of the specification, a computation parameter of the algorithm is defined as a rule followed by the algorithm when processing the plurality of values.

It will be appreciated that the controller of the multi-terminal DC electrical network may include a global control unit associated with the multi-terminal DC electrical network, or a combination of the global unit and a plurality of local control units respectively associated with the plurality of converters.

In practice, a multi-terminal DC electrical network can include very high numbers of DC terminals, DC power transmission media and converters, all of which are interconnected in a complex layout.

The configuration of the solver according to the invention to compute the no-load DC voltage as a function of the operating mode(s), default electrical characteristic(s) of the multi-terminal DC electrical network and/or computation parameter(s) of the algorithm, and electrical measurement(s) corresponding to a voltage or current in the multi-terminal DC electrical network not only results in a solver that is capable of computing a no-load DC voltage for the or each first designated converter to reliably control power flow in the multi-terminal DC electrical network, but also simplifies computation of the no-load DC voltage for the or each first designated converter.

In addition using the solver according to the invention enables provision of a no-load DC voltage for the or each first designated converter to control power flow in the multi-terminal DC electrical network in a way that optimizes power flow and power balance in the multi-terminal DC electrical network for a given set of first, second and third values, thus resulting in an efficient and reliable multi-terminal DC electrical network.

Each of the plurality of converters may be a designated converter, preferably a first designated converter.

The solver may be configured to use the algorithm to process the plurality of values to thereby compute a converter power order for at least one second designated converter as a function of the plurality of values, and wherein the controller is configured to operate the or each second designated converter in accordance with the or the respective converter power order.

In embodiments of the invention, the solver may be configured to use the algorithm to process the plurality of values to thereby compute a converter power order, a power ramp rate order and/or a DC voltage ramp rate order for the or each designated converter as a function of the plurality of values, and wherein the controller is configured to operate the or each designated converter in accordance with the or the respective converter power order, power ramp rate order and/or DC voltage ramp rate order.

Such configuration of the solver enhances the ability of the controller to provide control over the power flow in the multi-terminal DC electrical network.

In such embodiments, the solver may be configured to use the algorithm to process the plurality of values to thereby compute a power ramp rate order for each of a plurality of designated converters as a function of the plurality of values so as to equalize a plurality of power ramp times for the plurality of designated converters, the power ramp time for each of the plurality of designated converters being the time taken for that designated converter to attain a predefined converter power.

In other such embodiments, the solver may be configured to use the algorithm to process the plurality of values to thereby compute a DC voltage ramp rate order for each of a plurality of designated converters as a function of the plurality of values so as to equalize a plurality of DC voltage ramp times for the plurality of designated converters, the DC voltage ramp time for each of the plurality of designated converters being the time taken for that designated converter to attain a predefined DC converter voltage.

Configuration of the solver to equalize the power and/or DC voltage ramp times for the plurality of designated converters ensures synchronization of action of the plurality of designated converters in modifying their respective powers to attain a respective converter power and/or their respective DC voltages to attain a respective DC converter voltage.

The solver may be configured to use the algorithm to process the plurality of values to thereby compute a DC power transmission medium current for at least one designated DC power transmission medium, a converter current for the or each designated converter, a converter voltage for the or each designated converter, a converter power for the or each designated converter and/or a converter power error for the or each designated converter.

For the purposes of this specification, a converter power error is defined as the difference between a preliminary converter power order and the computed converter power for a designated converter.

The solver may be configured to use the algorithm to process the plurality of values to thereby compute a DC power transmission medium current for the or each designated DC power transmission medium, a converter current for the or each designated converter, a converter voltage for the or each designated converter and/or a converter power error for the or each designated converter in accordance with a or a respective predefined limit.

Computation of the DC power transmission medium current for the or each designated DC power transmission medium, the converter current for the or each designated converter, the converter voltage for the or each designated converter and/or the converter power error limit for the or each designated converter enables them to be checked to ensure compliance with a or a respective predefined limit whilst the solver is using the algorithm to process the plurality of values, thus improving the efficiency and reliability of the solver in using the algorithm to process the plurality of values to provide computed outputs for controlling the or each designated converter.

By configuring the solver to compute outputs for controlling the or each designated converter that results in compliance of the DC power transmission medium current for the or each designated DC power transmission medium, the converter current for the or each designated converter, the converter voltage for the or each designated converter and/or the converter power error for the or each designated converter with a or a respective predefined limit, the control of power flow in the multi-terminal DC electrical network can be further optimized.

The solver may be configured to use the algorithm to process the plurality of values to thereby sequentially compute at least two of: a DC power transmission medium current for the or each designated DC power transmission medium; a converter current for the or each designated converter; a converter voltage for the or each designated converter; a converter power for the or each designated converter; a converter power error for the or each designated converter. Configuring the solver in this manner enables the sequentially computed outputs to be sequentially checked to ensure their compliance with a or a respective predefined limit whilst the solver is using the algorithm to process the plurality of values. This has the benefit of saving computation time in comparison to simultaneously computing and checking at least two of: the DC power transmission medium current for the or each designated DC power transmission medium; a converter current for the or each designated converter; a converter voltage for the or each designated converter; a converter power error for the or each designated converter. This has the effect of further improving the efficiency and reliability of the solver in using the algorithm to process the plurality of values.

The solver may be configured to use the algorithm to iteratively process the plurality of values. Configuring the solver to use the algorithm to iteratively process the plurality of values to provide computed outputs for controlling the or each designated converter improves computation of the computed outputs for controlling the or each designated converter, thereby further optimizing control of power flow in the multi-terminal DC electrical network.

The solver may be configured to use the algorithm to iteratively process the plurality of values to re-compute the DC power transmission medium current for the or each designated DC power transmission medium, the converter current for the or each designated converter, the converter voltage for the or each designated converter and/or the converter power error for the or each designated converter when the computed DC power transmission medium current, the computed converter current, the computed converter voltage and/or the computed converter power error for a prior iteration is not in accordance with the or the respective predefined limit.

The solver may be configured to use the algorithm to process the plurality of values to thereby compute a converter power error for the or each designated converter and to stop the iterative processing of the plurality of values when a difference between computed converter power errors of successive iterations is at or below a converter power error difference limit. Configuring the solver in this manner ensures that the iterative processing of the plurality of values is terminated at a suitable convergence of the computed outputs for controlling the or each designated converter, and thereby improves the efficiency of the solver in computing the outputs for controlling the or each designated converter.

As indicated above, the or each first value defines an operating mode of the or each designated converter. For example, the or each first value may be defined by a value selected from a group including:
  a preliminary converter power order;
  a first operating state to configure the designated converter to constantly operate in a power control mode;
  a second operating state to configure the designated converter to operate in a power control mode and to switch from the power control mode to a DC voltage control mode after operating at a minimum or maximum DC voltage limit for a predefined period of time;
  a third operating state to configure the designated converter to constantly operate in a voltage control mode;
  a converter droop characteristic, preferably a converter DC voltage-direct current droop characteristic;
  a converter minimum power ramp rate.

The or each first value may be provided to the solver in the form of an operator inputted value.

As indicated above, the or each second value defines a default electrical characteristic of the multi-terminal DC electrical network or a computation parameter of the algorithm. For example, the or each second value may be defined by a value selected from a group including:

a base voltage value that is a rated voltage of the DC electrical network;

a base current value that is calculated by dividing a rated power of the DC electrical network by a rated voltage of the DC electrical network;

a base impedance value that is a rated impedance of a DC power transmission medium;

a maximum number of iterations for processing the plurality of values;

a load reference set point DC voltage;

a converter current rating limit;

a converter voltage rating limit;

a DC power transmission medium current rating limit;

an accuracy factor to control the computational accuracy of the algorithm, wherein the accuracy factor is defined by a converter power error limit or a power error difference limit;

an algorithm acceleration factor to control the computational speed of the algorithm when iteratively processing the plurality of values;

an optimization toggle controllable to select whether the plurality of values is to be processed by the algorithm in accordance with one or more voltage or current rating limits;

a DC power transmission medium impedance.

As indicated above, the or each third value defines an electrical measurement corresponding to a voltage or current in the multi-terminal DC electrical network. For example, the or each third value may be defined by a value selected from a group including:

a converter voltage;

a converter current;

a DC power transmission medium current.

The configuration of the solver according to the invention enables it to take into account a wide range of operating modes, default electrical characteristics of the multi-terminal DC electrical network, computation parameters of the algorithm, and electrical measurements corresponding to a voltage or current in the multi-terminal DC electrical network in order to compute the no-load DC voltage for each converter. This in turn enables high quality control of power flow in the multi-terminal DC electrical network.

The controller may be configured to perform an integrity validation of the integrity of the or each first value. The solver may be further configured to use the algorithm to process the plurality of values only if the integrity of the or each first value is validated by the integrity validation, wherein the or each first value has a valid integrity when one or more prerequisites are met. This ensures that the solver does not waste computation time in processing one or more first values without a valid integrity.

The or each first value may have a valid integrity when:

a representative matrix of the multi-terminal DC electrical network is square and has a non-zero determinant;

the first value or at least one of the first values is defined by the second or third operating state;

the or each preliminary converter power order for the or each designated converter is in the range of −1 and +1 per unit; and/or an or a respective operating state to configure the or each designated converter is defined by any of the first, second and third operating states.

It will be understood that a representative matrix of the multi-terminal DC electrical network can be derived from the number of DC terminals and DC power transmission media in the multi-terminal DC electrical network. As such the representative matrix is a system dependent parameter in that its structure changes with the number of DC terminals and DC power transmission media in the multi-terminal DC electrical network.

According to a second aspect of the invention, there is provided a method of controlling power flow in a multi-terminal DC electrical network, the multi-terminal DC electrical network comprising:

a plurality of DC terminals, each DC terminal being operatively connected to at least one other DC terminal via a respective DC power transmission medium; and a plurality of converters, each converter being operatively connected to a respective one of the DC terminals, the plurality of converters including at least one designated converter;

wherein the method includes the steps of:

(i) using an algorithm to process a plurality of values to thereby compute a no-load DC voltage for at least one first designated converter as a function of the plurality of values, the plurality of values including:

at least one first value defining an operating mode of the or each designated converter;

at least one second value defining a default electrical characteristic of the multi-terminal DC electrical network or a computation parameter of the algorithm; and at least one third value defining an electrical measurement corresponding to a voltage or current in the multi-terminal DC electrical network, (ii) operating the or each first designated converter in accordance with the or the respective computed no-load DC voltage.

A preferred embodiment of the invention will now be described, by way of a non-limiting example, with reference to the accompanying drawings in which.

Figure 1:
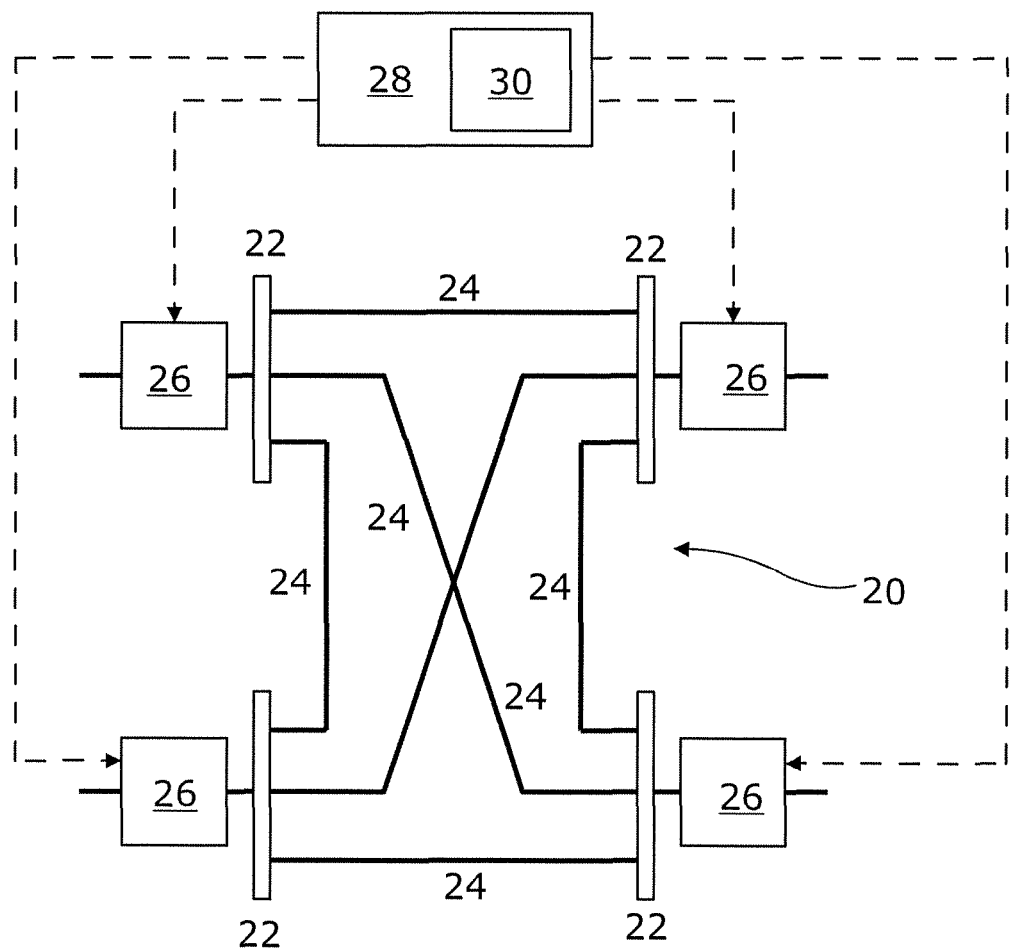
FIG. 1 shows, in schematic form, a multi-terminal DC electrical network according to an embodiment of the invention.
Figure 3:
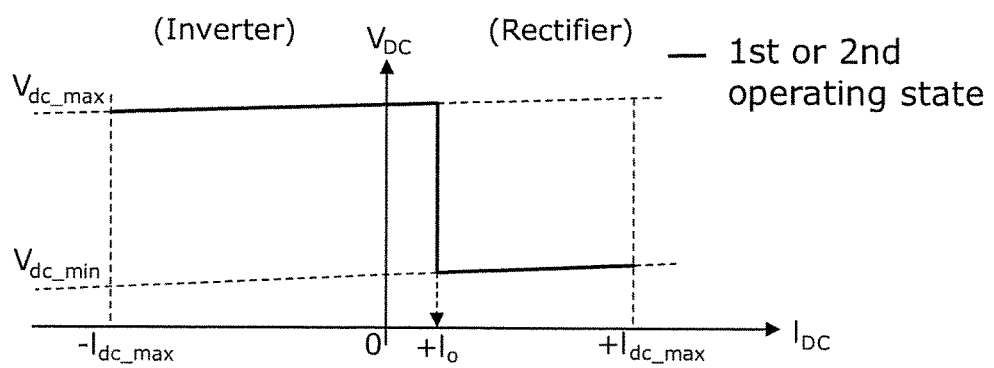
Figure 4:
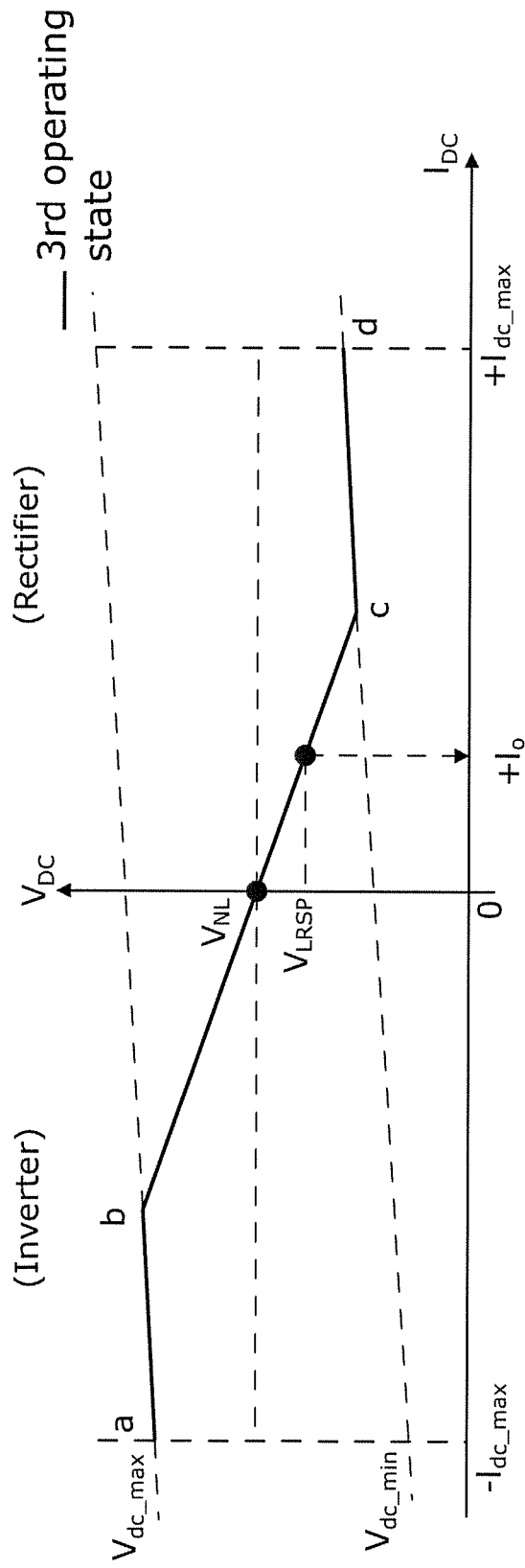
Figure 5:
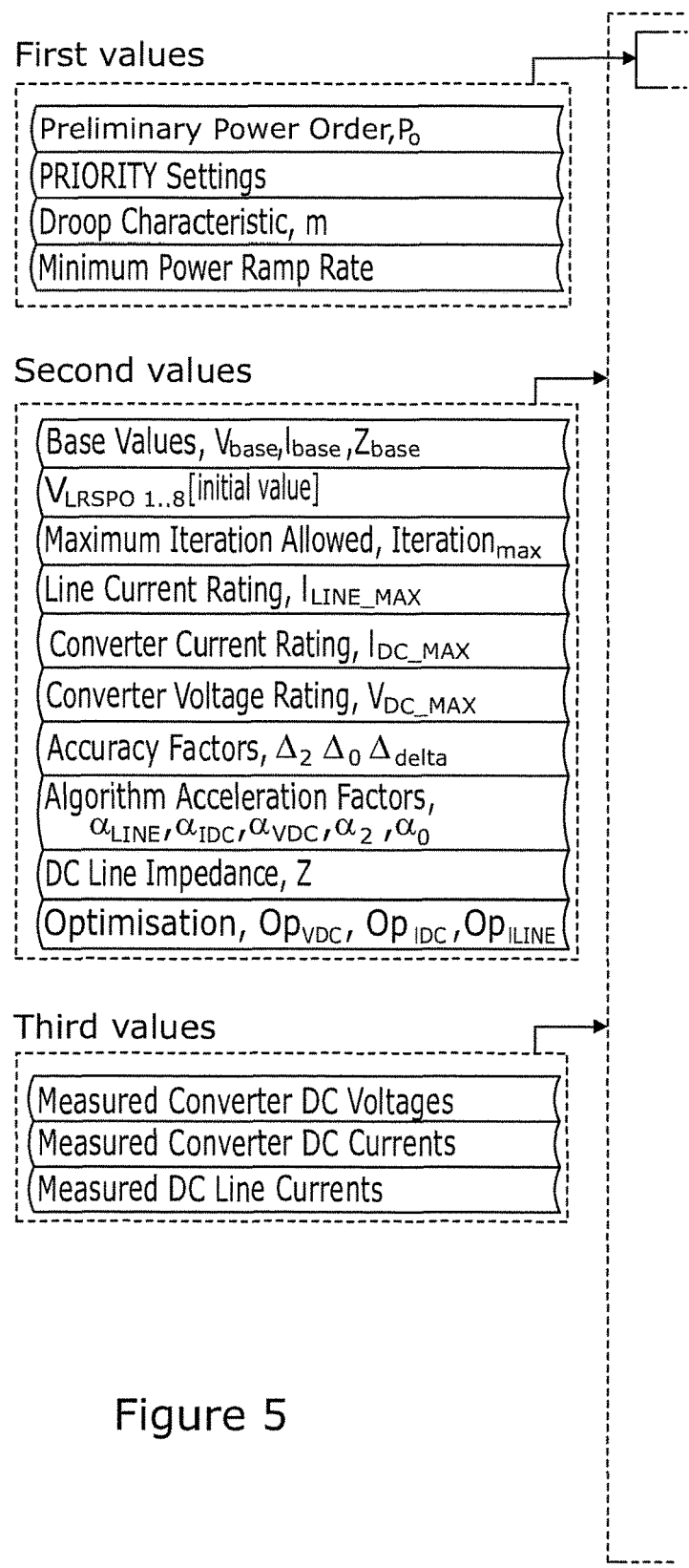
Figure 5:
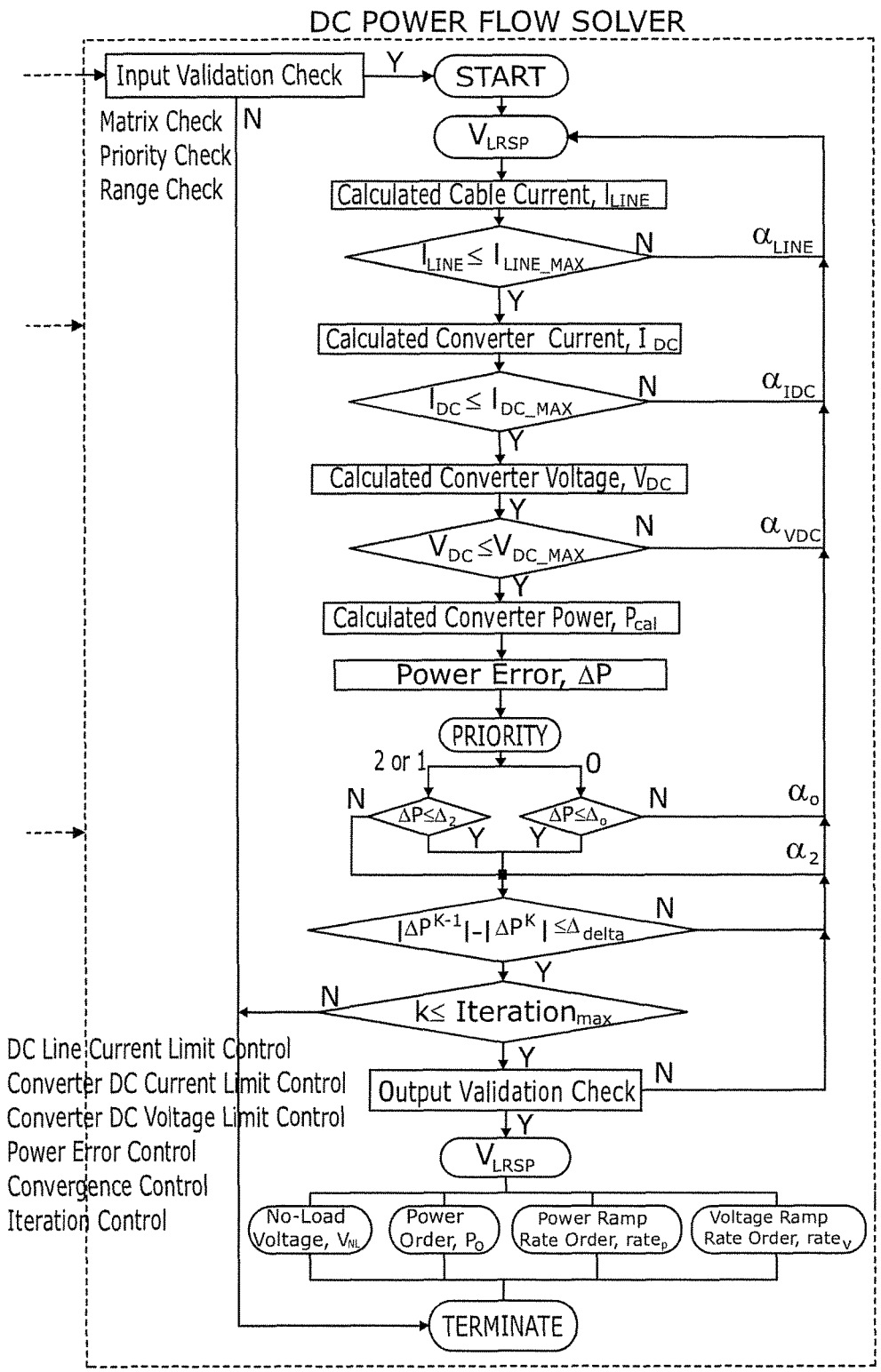

FIGS. 3 and 4 respectively illustrate, in graph form, power control and voltage control modes of each designated converter of the multi-terminal DC electrical network of FIG. 1; and FIG. 5 illustrates, in flow-chart form, the operation of the solver to compute outputs for controlling each designated converter of the multi-terminal DC electrical network of FIG. 1.

A multi-terminal DC electrical network 20 according to an embodiment of the invention is shown in FIG. 1.

The multi-terminal DC electrical network 20 comprises a plurality of DC terminals 22. Each DC terminal 22 is operatively connected to at least one other DC terminal 22 via a respective DC power transmission line 24.

The multi-terminal DC electrical network 20 further includes a plurality of converters 26. Each converter 26 is operatively connected to a respective one of the DC terminals 22. In use, each converter 26 interconnects the corresponding DC terminal 22 to another electrical network, and is operable to provide power conversion between the electrical network and the DC terminal 22.

The multi-terminal DC electrical network 20 further includes a controller 28. In the embodiment shown, the controller 28 is in the form of a combination of a global control unit and a plurality of local control units (not shown) respectively associated with the plurality of converters 26.

In other embodiments of the invention, it is envisaged that the controller 28 may be in the form of a global control unit.

In the embodiment shown, each converter 26 is a designated converter 26 and each DC power transmission line 24 is a designated DC power transmission line 24. It will be appreciated that, in other embodiments of the invention, at least one, but not all, of the plurality of converters is a designated converter, and/or at least one, but not all, of the plurality of DC power transmission lines is a designated DC power transmission line.

Figure 2:
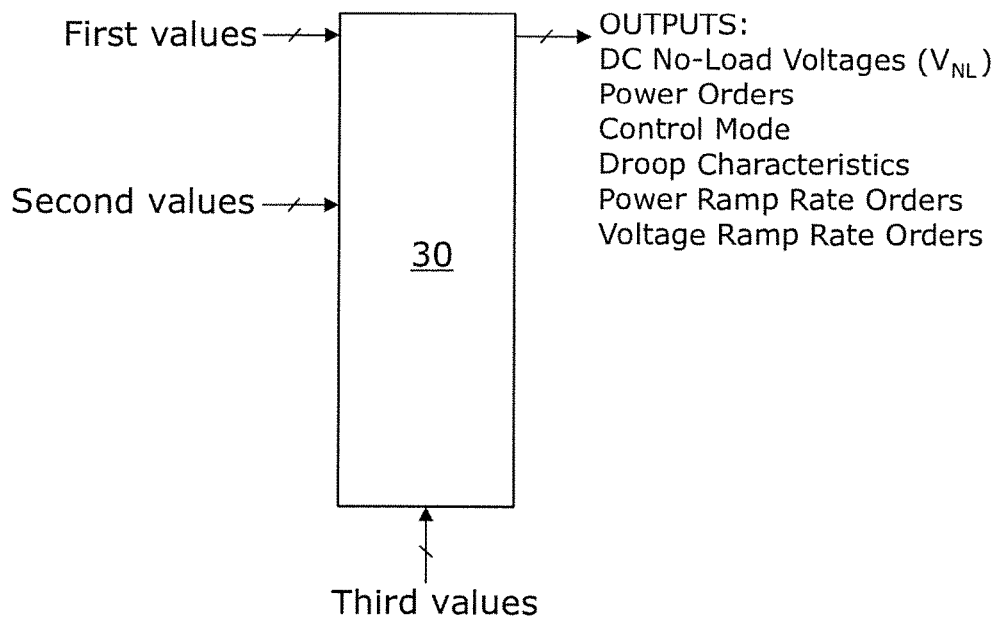
FIG. 2 shows, in schematic form, a solver forming part of the controller of the multi-terminal DC electrical network of FIG. 1.

The controller 28 includes a solver 30. FIG. 2 shows, in schematic form, the solver 30 which is configured to use an algorithm to process a plurality of values to thereby compute a plurality of outputs for controlling each designated converter 26 as a function of the plurality of values.

The plurality of values includes a plurality of first values, a plurality of second values and a plurality of third values.

The controller 28 is preferably configured to include an operator interface such that the plurality of first values can be inputted into the solver 30 by a human operator using the operator interface. The plurality of first values define operating modes of each designated converter 26, and are defined by:
- a preliminary converter power order;
- a first operating state to configure the designated converter 26 to constantly operate in a power control mode, as shown in FIG. 3;
- a second operating state to configure the designated converter 26 to operate in a power control mode and to switch from the power control mode to a DC voltage control mode after operating at a minimum or maximum DC voltage limit $V_{dc\_min}, V_{dc\_max}$ for a predefined period of time;
- a third operating state to configure the designated converter 26 to constantly operate in a DC voltage control mode;
- a converter DC voltage-direct current droop characteristic;
- a converter minimum power ramp rate.

The preliminary converter power order is defined as an order for the designated converter 26 to exchange a certain level of active power whilst disregarding power losses in the plurality of designated converters 26 and the rest of the multi-terminal DC network.

FIG. 3 illustrates, in graph form, a power control mode of each designated converter 26. The power control mode is defined as a mode in which the designated converter 26 is operated to maintain its local power demands during its operation as an inverter or rectifier. The designated converter 26 in the power control mode may operate at a minimum or maximum DC voltage limit $V_{dc\_min}, V_{dc\_max}$.

FIG. 4 illustrates, in graph form, a voltage control mode of each converter 26 that includes the converter DC voltage-direct current droop characteristic (as indicated by the line connecting "b" and "c", i.e. the line between the minimum and maximum DC voltages $V_{dc\_min}, V_{dc\_max}$). The voltage control mode is defined as a mode in which the designated converter 26 is operated as a slack converter 26 during its operation as an inverter or rectifier. This allows balancing of the total load on the multi-terminal DC electrical network 20 so that the power imported by one or more designated converters 26 acting as a receiving end converter is equal to the power exported by one or more designated converters 26 acting as a sending-end converter minus any power losses.

The converter droop characteristic is defined as a steady state operating frame of the designated converter 26 in terms of $V_{DC}$ and $I_{DC}$, where the droop definition is based on $V_{DC}/I_{DC}$.

The converter minimum power ramp rate is defined as a minimum rate of change of power for the designated converter 26.

The plurality of second values define default electrical characteristics of the multi-terminal DC electrical network 20 and computation parameters of the algorithm, and are defined by:
- a base voltage value, $V_{base}$ that is a rated voltage of the multi-terminal DC electrical network 20;
- a base current value, $I_{base}$ that is calculated by dividing a rated power of the multi-terminal DC electrical network 20 by a rated voltage of the multi-terminal DC electrical network 20;
- a base impedance value, $Z_{base}$ that is a rated impedance of a DC power transmission line 24;
- a maximum number of iterations, iteration$_{max}$ for processing the plurality of values;
- a load reference set point DC voltage, $V_{LRSP\_initial}$;
- a converter current rating limit, $I_{DC\_MAX}$;
- a converter voltage rating limit, $V_{DC\_MAX}$;
- a DC power transmission line current rating limit, $I_{LINE\_MAX}$;
- a plurality of accuracy factors $\Delta_0, \Delta_2, \Delta_{delta}$ to control the computational accuracy of the algorithm;
- a plurality of algorithm acceleration factors $\alpha_{line}, \alpha_{IDC}, \alpha_{VDC}, \alpha_0, \alpha_2$ to control the computational speed of the algorithm when iteratively processing the plurality of values. Each algorithm acceleration factor is in the range of 0 and 1;
- a plurality of optimization toggles $Op_{LINE}, Op_{IDC}, Op_{VDC}$;
- a DC power transmission line impedance Z.

The plurality of third values define an electrical measurement corresponding to a voltage or current in the multi-terminal DC electrical network 20, and are defined by:
- a converter voltage;
- a converter current;
- a DC power transmission line current.

The plurality of outputs for controlling each converter 26 are:
- a no-load DC voltage for each converter 26;
- a converter power order for each converter 26;
- a power ramp rate order for each converter 26;
- a DC voltage ramp rate order for each converter 26.

The controller 28 is further configured to operate each converter 26 in accordance with the respective computed plurality of outputs.

Operation of the solver 30 to use the algorithm to compute the plurality of outputs as a function of the plurality of values is described as follows, with reference to FIG. 5.

Once the plurality of first values has been inputted into the solver 30, the controller 28 performs an integrity validation of the integrity of each first value before the solver 30 uses the algorithm to process the plurality of values to thereby compute the plurality of outputs as a function of the plurality of values. The solver 30 is further configured to use the algorithm to process the plurality of values only if the integrity of each first value is validated by the integrity validation. Therefore, the solver 30 terminates the algorithm and thereby does not compute the plurality of outputs if the integrity of each first value is not validated by the integrity validation. At this stage the controller 28 provides a warning message to the operator so that the operator is aware of the need to input new first values due to the invalid integrity of the first values.

Each first value has a valid integrity when:
- representative matrices of the multi-terminal DC electrical network 20 are square and has a non-zero determinant;
- at least one of the first values is defined by the second or third operating state;
- each preliminary converter power order for each designated converter 26 is in the range of −1 and +1 per unit; and
- a respective operating state to configure each designated converter 26 is defined by any of the first, second and third operating states.

When the integrity of the plurality of first values has been validated by the integrity validation, the solver 30 uses the algorithm to process the plurality of values to thereby sequentially compute a DC power transmission line current for each designated DC power transmission line 24, a converter current for each converter 26, a converter voltage for each designated converter 26 and a converter power for each designated converter 26. In the embodiment shown, computation of the designated DC power transmission line current is followed by computation of the converter current for each designated converter 26 followed by the computation of the converter voltage for each designated converter 26 followed by computation of the converter power for each designated converter 26.

Such computation by the solver 30 is performed using a series of matrices in accordance with the following equations.

The converter DC voltage-direct current droop characteristic of FIG. 4 can be expressed as:

$$V_{DC_i} = m_i I_{DC_i} + V_{LRSP_i} - m_i I_{0_i}$$

where the subscript i refers to the respective designated converter 26
- $V_{DC}$ and $I_{DC}$ is to the converter voltage and current of the respective designated converter 26;
- m is the gradient of the converter DC voltage-direct current droop characteristic for the respective designated converter 26;
- $V_{LRSP}$ is the load reference set point DC voltage for the respective designated converter 26;
- $I_0$ is the current order for the respective designated converter 26.

The current order to is calculated by dividing a preliminary converter power order $P_0$ for the respective designated converter by the respective load reference set point DC voltage $V_{LRSP}$.

A no-load DC voltage $V_{NL}$, which is a DC voltage of the respective designated converter 26 at zero current, can be expressed as:

$$V_{NLi} = V_{LRSP_i} - m_i \frac{P_{0_i}}{V_{LRSP_i}}$$

The voltage drop across each DC power transmission line impedance $I_{LINE}$ is expressed as:

$$V_{DC_i} - V_{DC_{i+1}} = Z_i I_{LINE}$$

The converter current $I_{DC}$ for each designated converter 26 is found by employing Kirchhoff's current law in relation to the DC power transmission line current $I_{LINE}$ in each DC power transmission line 24.

The DC power transmission line current $I_{LINE}$ in each DC power transmission line 24 can be expressed as:

$$[I_{LINE}] = A^{-1} \cdot (B[V_{LRSP}] + C[P_0/V_{LRSP}])$$

where A, B and C are representative matrices of the multi-terminal DC electrical network 20.

It will be understood that the representative matrices A, B and C of the multi-terminal DC electrical network 20 can be derived from the number of DC terminals 22 and DC power transmission lines 24 in the multi-terminal DC electrical network 20. As such the representative matrices A, B and C are system dependent parameters in that their respective structures change with the number of DC terminals 22 and DC power transmission lines 24 in the multi-terminal DC electrical network 20.

The converter power for each designated converter 26 is expressed as:

$$P_{cal_i} = V_{DC_i} \times I_{DC_i}$$

After computing the DC power transmission line current $I_{LINE}$, the computed DC power transmission line current $I_{LINE}$ is checked against the DC power transmission line current rating limit $I_{LINE\_MAX}$. If the computed DC power transmission line current $I_{LINE}$ exceeds the DC power transmission line current rating limit $I_{LINE\_MAX}$, a first iterative correction loop is triggered.

The first iterative correction loop involves re-computing the DC power transmission line current $I_{LINE}$ using a modified $V_{LRSP}$, which is obtained as follows:

$$V_{LRSP_i}^k = V_{LRSP_i}^{k-1} + \alpha_{LINE} \cdot (|I_{LINE_j}^k| - I_{LINE\_MAX_j})$$

where k refers to the number of iteration cycles
j refers to the respective DC power transmission line 24.

The first iterative correction loop is repeated until the recomputed DC power transmission line current $I_{LINE}$ is equal to or less than the DC power transmission line current rating limit $I_{LINE\_MAX}$. To speed up the algorithm's processing of the plurality of values, the algorithm acceleration factor $\alpha_{line}$ from the plurality of second values can be adjusted accordingly.

After computing the converter current $I_{DC}$ for each designated converter 26, the computed converter current $I_{DC}$ for each designated converter 26 is checked against the converter current rating limit $I_{DC\_MAX}$. If the computed converter current $I_{DC}$ for each designated converter 26 exceeds the converter current rating limit $I_{DC\_MAX}$, a second iterative correction loop is triggered.

The second iterative correction loop involves re-computing the DC power transmission line current $I_{LINE}$ and the converter current $I_{DC}$ using a modified $V_{LRSP}$, which is obtained as follows:

$$V_{LRSP_i}^k = V_{LRSP_i}^{k-1} + \alpha_{IDC} \cdot (|I_{DC_i}^k| - I_{DC\_MAX_i})$$

The second iterative correction loop is repeated until the computed converter current $I_{DC}$ for each designated converter 26 is equal to or less than the converter current rating limit $I_{DC\_MAX}$. To speed up the algorithm's processing of the plurality of values, the algorithm acceleration factor $\alpha_{IDC}$ from the plurality of second values can be adjusted accordingly.

After computing the converter voltage $V_{DC}$ for each designated converter 26, the computed converter voltage $V_{DC}$ for each designated converter 26 is checked against the converter voltage rating limit $V_{DC\_MAX}$. If the computed converter voltage $V_{DC}$ for each designated converter 26 exceeds the converter voltage rating limit $V_{DC\_MAX}$, a third iterative correction loop is triggered.

The third iterative correction loop involves re-computing the DC power transmission line current $I_{LINE}$, the converter current $I_{DC}$ and the converter voltage $V_{DC}$ using a modified $V_{LRSP}$, which is obtained as follows:

$$V_{LRSP_i}{}^k = V_{LRSP_i}{}^{k-1} + \alpha_{VDC} \cdot (|V_{DC_i}{}^k| - V_{DC\_MAX_i})$$

The third iterative correction loop is repeated until the computed converter voltage $V_{DC}$ for each designated converter 26 is equal to or less than the converter voltage rating limit $V_{DC\_MAX}$. To speed up the algorithm's processing of the plurality of values, the algorithm acceleration factor $\alpha_{VDC}$ from the plurality of second values can be adjusted accordingly.

After computing the converter power $P_{cal}$ for each designated converter 26, a computed converter power error $\Delta P$ for each designated converter 26 is checked against a converter power error limit as defined by an accuracy factor $\Delta_0, \Delta_2$. The converter power error limit for each designated converter 26 depends on whether that designated converter 26 is designated to operate in accordance with the first, second or third operating state. If a particular designated converter 26 is designated to operate in accordance with the first or second operating state, the converter power error limit is defined as a first accuracy factor $\Delta_2$, which is defined as a near-zero value, e.g. $10^{-10}$. If a particular designated converter 26 is designated to operate in accordance with the third operating state, the converter power error limit is defined as a second accuracy factor $\Delta_0$, which is defined as a non near-zero value, e.g. 0.01, which may be dependent on the loss characteristic of the corresponding DC power transmission line 24. The first and second accuracy factors $\Delta_2, \Delta_0$ may be adjusted to permit faster processing of the plurality of values at the expense of less computational accuracy in terms of correspondence of the computed converter power $P_{cal}$ with the preliminary converter power order $P_0$ for each designated converter 26.

The first accuracy factor $\Delta_2$ may be several orders of magnitude smaller than the second accuracy factor $\Delta_0$.

If the computed converter power error $\Delta P$ for the or each designated converter 26 operating in the power control mode exceeds the converter power error limit defined by the first accuracy factor $\Delta_2$, a fourth iterative correction loop is triggered.

The fourth iterative correction loop involves re-computing the DC power transmission line current $I_{LINE}$, the converter current $I_{DC}$, the converter voltage $V_{DC}$ and the converter power $P_{cal}$ using a modified $V_{LRSP}$, which is obtained as follows:

$$V_{LRSP_i}{}^k = V_{LRSP_i}{}^{k-1} + \alpha_2 \cdot (\Delta P_i{}^k)$$

The fourth iterative correction loop is repeated until the computed converter power error $\Delta P$ for the or each designated converter 26 operating in the power control mode is equal to or less than the converter power error limit defined by the first accuracy factor $\Delta_2$. This ensures that the computed converter power $\Delta P$ for the or each designated converter 26 operating in the power control mode is substantially equal to the or the respective preliminary converter power order $P_0$. To speed up the algorithm's processing of the plurality of values, the algorithm acceleration factor $\alpha_2$ from the plurality of second values can be adjusted accordingly.

If the computed converter power error $\Delta P$ for the or each designated converter 26 operating in the DC voltage control mode exceeds the converter power error limit defined by the second accuracy factor $\Delta_0$, a fifth iterative correction loop is triggered.

The fifth iterative correction loop involves re-computing the DC power transmission line current $I_{LINE}$, the converter current $I_{DC}$, the converter voltage $V_{DC}$ and the converter power $P_{cal}$ using a modified $V_{LRSP}$, which is obtained as follows:

$$V_{LRSP_i}{}^k = V_{LRSP_i}{}^{k-1} + \alpha_0 \cdot (\Delta P_i{}^k)$$

The fifth iterative correction loop is repeated until the computed converter power error $\Delta P$ for the or each designated converter 26 operating in the DC voltage control mode is equal to or less than the converter power error limit defined by the second accuracy factor $\Delta_0$. This ensures that the computed converter power $\Delta P$ for the or each designated converter 26 operating in the DC voltage control mode is substantially equal to the or the respective preliminary power order $P_0$, after taking into account any power losses. To speed up the algorithm's processing of the plurality of values, the algorithm acceleration factor $\alpha_0$ from the plurality of second values can be adjusted accordingly.

Configuring the solver 30 in this manner enables the sequentially computed outputs to be sequentially checked to ensure their compliance with the respective predefined limit whilst the solver 30 is using the algorithm to process the plurality of values. This has the benefit of saving computation time in comparison to simultaneously computing and checking the DC power transmission line current $I_{LINE}$, the converter current $I_{DC}$, the converter voltage $V_{DC}$ and the converter power error $\Delta P$. This has the effect of further improving the efficiency and reliability of the solver 30 in using the algorithm to process the plurality of values.

Each of the plurality of optimization toggles $Op_{LINE}$, $Op_{IDC}$, $Op_{VDC}$ is controllable by the operator to select whether or not the plurality of values is to be processed by the algorithm in accordance with some or none of the DC power transmission line current rating limit $I_{LINE\_MAX}$, the converter current rating limit $I_{DC\_MAX}$ and the converter voltage rating limit $V_{DC\_MAX}$. This permits faster processing of the plurality of values at the expense of non-compliance with some or all of the DC power transmission line current rating limit $I_{LINE\_MAX}$, the converter current rating limit $I_{DC\_MAX}$ and the converter voltage rating limit $V_{DC\_MAX}$.

The solver 30 is further configured to stop the iterative processing of the plurality of values when a difference between computed converter power errors $\Delta P$ of successive iterations is at or below a power error difference limit defined by a third accuracy factor $\Delta_{delta}$. If the difference between computed converter power errors $\Delta P$ of successive iterations is not at or below a power error difference limit defined by the third accuracy factor $\Delta_{delta}$, a sixth iterative correction loop is triggered.

The sixth iterative correction loop involves re-computing the DC power transmission line current $I_{LINE}$, the converter current $I_{DC}$, the converter voltage $V_{DC}$ and the converter power $P_{cal}$ until the difference between computed converter power errors $\Delta P$ of successive iterations is at or below a power error difference limit defined by the third accuracy factor $\Delta_{delta}$.

Configuring the solver 30 in this manner ensures that the iterative processing of the plurality of values is terminated at a suitable convergence of the computed outputs for controlling each designated converter 26, and thereby improves the efficiency of the solver 30 in computing the outputs for controlling each designated converter 26. The third accuracy factor $\Delta_{delta}$ may be adjusted to permit faster processing of the plurality of values at the expense of less computational accuracy in terms of better convergence of the computed outputs for controlling each designated converter 26.

The solver 30 then checks whether the maximum number of iterations iteration$_{max}$ has been reached. If the maximum number of iterations iteration$_{max}$ is exceeded, the solver 30 terminates the algorithm and provides a warning message to the operator so that the operator is aware that the maximum number of iterations iteration$_{max}$ has been exceeded. Configuring the solver 30 in this manner prevents the algorithm from iteratively processing the plurality of values in a continuous manner without producing the computed outputs for controlling each designated converter 26.

If the maximum number of iterations iteration$_{max}$ is not exceeded, the controller 28 performs an output validation check to confirm compliance with the following conditions:

the DC power transmission line current $I_{LINE}$ is equal to or less than the DC power transmission line current limit $I_{LINE\_MAX}$;

the converter current $I_{DC}$ for each designated converter 26 is equal to or less than the predefined converter current limit $I_{DC\_MAX}$;

the converter voltage $V_{DC}$ for each designated converter 26 is equal to or less than the converter voltage rating limit $V_{DC\_MAX}$;

the converter power error $\Delta P$ for the or each designated converter 26 operating in the power control mode is equal to or less than the converter power error limit defined by the first accuracy factor $\Delta_2$;

the converter power error $\Delta P$ for the or each designated converter 26 operating in the DC voltage control mode is equal to or less than the converter power error limit defined by the second accuracy factor $\Delta_0$;

the difference between computed converter power errors $\Delta P$ of successive iterations is at or below a power error difference limit defined by the third accuracy factor $\Delta_{delta}$; and the maximum number of iterations iteration$_{max}$ has not been exceeded.

If one or more of the above conditions is not met, a seventh iterative correction loop is triggered.

The seventh iterative correction loop involves re-computing the DC power transmission line current $I_{LINE}$, the converter current $I_{DC}$, the converter voltage $V_{DC}$ and the converter power $P_{cal}$ until the output validation check confirms compliance with all of the above conditions.

The solver 30 then uses the algorithm to process the computed output DC load reference set point voltage to compute the plurality of outputs for controlling each designated converter 26, namely the no-load DC voltages $V_{NL}$, converter power orders, power ramp rate orders and DC voltage ramp rate orders for the plurality of designated converters 26.

The solver 30 is configured to use the algorithm to process the plurality of values to thereby compute power and DC voltage ramp rate orders for each designated converter 26 as a function of the plurality of values so as to equalize a plurality of power and DC voltage ramp times for the plurality of designated converters. The power ramp time for each designated converter 26 is the time taken for that designated converter 26 to attain the computed converter power. The DC voltage ramp time for each designated converter 26 is the time taken for that designated converter 26 to attain the computed no-load DC voltage $V_{NL}$.

Configuration of the solver 30 to equalize the power and DC voltage ramp times for the plurality of designated converters 26 ensures synchronization of action of the plurality of converters 30 in modifying their respective powers to attain the respective converter power in accordance with the respective converter power order, and their respective DC voltages $V_{DC}$ to attain the respective converter power in accordance with the respective computed no-load DC voltage $V_{NL}$.

The operator interface presents the operator with the computed plurality of outputs, the computed DC power transmission line currents, the computed converter currents and the computed converter voltages.

The operator can choose to accept the computed plurality of outputs, or reject the computed plurality of outputs and input a new preliminary converter power order $P_0$ for each designated converter 26 into the solver to obtain a new computed plurality of outputs. When the operator accepts the computed plurality of outputs from the solver 30, the computed no-load DC voltages $V_{NL}$, converter power orders, power ramp rate orders and DC voltage ramp rate orders are despatched to the plurality of local control units to operate each designated converter 26 in accordance with the respective no-load DC voltage $V_{NL}$, converter power order, power ramp rate order and DC voltage ramp rate order.

The configuration of the solver 30, as shown in FIGS. 2 and 5, to use the algorithm to compute the no-load DC voltage $V_{NL}$, converter power order, power ramp rate order and DC voltage ramp rate order as a function of the plurality of values, namely the operating modes of the designated converters 26, default electrical characteristics of the multi-terminal DC electrical network 20, computation parameters of the algorithm and electrical measurements corresponding to voltage and currents in the multi-terminal DC electrical network 20 not only results in a solver 30 that is capable of computing the no-load DC voltage $V_{NL}$, converter power order, power ramp rate order and DC voltage ramp rate order for each designated converter 26 to reliably control power flow in the multi-terminal DC electrical network 20, but also simplifies computation of the no-load DC voltage $V_{NL}$, converter power order, power ramp rate order and DC voltage ramp rate order for each designated converter 26.

The configuration of the solver 30 thus enables it to take into account a wide range of operating modes of the designated converters 26, default electrical characteristics of the multi-terminal DC electrical network 20, computation parameters of the algorithm and electrical measurements corresponding to voltages and currents in the multi-terminal DC electrical network 20 in order to compute the no-load DC voltage $V_{NL}$, converter power order, power ramp rate order and DC voltage ramp rate order for each designated converter 26. This in turn enables high quality control of power flow in the multi-terminal DC electrical network 20.

In addition using the solver 30 enables provision of a no-load DC voltage $V_{NL}$, converter power order, power ramp rate order and DC voltage ramp rate order for each converter 26 to control power flow in the multi-terminal DC electrical network 20 in a way that optimizes power flow and power balance in the multi-terminal DC electrical network 20 for the plurality of first, second and third values, thus resulting in an efficient and reliable multi-terminal DC electrical network 20.

It will be appreciated that the topology of the multi-terminal DC electrical network 20 is merely chosen to help illustrate the operation of the invention, and that the multi-terminal DC electrical network 20 may be respectively replaced by another converter with a different topology and by another multi-terminal DC electrical network 20 with a different topology.

The invention claimed is:

1. A multi-terminal DC electrical network comprising:
   a plurality of DC terminals, each DC terminal being operatively connected to at least one other DC terminal via a respective DC power transmission medium;
   a plurality of converters, each converter being operatively connected to a respective one of the DC terminals, the plurality of converters including at least one designated converter; and
   a controller including a solver configured to use an algorithm to process a plurality of values to thereby compute a no-load DC voltage for at least one first designated converter as a function of the plurality of values, the plurality of values including:
      at least one first value defining an operating mode of the or each designated converter;
      at least one second value defining a default electrical characteristic of the multi-terminal DC electrical network or a computation parameter of the algorithm; and
      at least one third value defining an electrical measurement corresponding to a voltage or current in the multi-terminal DC electrical network,
   wherein the controller is configured to operate the or each first designated converter in accordance with the or the respective computed no-load DC voltage.

2. A multi-terminal DC electrical network according to claim 1 wherein each of the plurality of converters is a designated converter, preferably a first designated converter.

3. A multi-terminal DC electrical network according to claim 1 wherein the solver is configured to use the algorithm to process the plurality of values to thereby compute a converter power order for at least one second designated converter as a function of the plurality of values, and wherein the controller is configured to operate the or each second designated converter in accordance with the or the respective converter power order.

4. A multi-terminal DC electrical network according to claim 1 wherein the solver is configured to use the algorithm to process the plurality of values to thereby compute a converter power order, a power ramp rate order and/or a DC voltage ramp rate order for the or each designated converter as a function of the plurality of values, and wherein the controller is configured to operate the or each designated converter in accordance with the or the respective converter power order, power ramp rate order and/or DC voltage ramp rate order.

5. A multi-terminal DC electrical network according to claim 4 wherein the solver is configured to use the algorithm to process the plurality of values to thereby compute a power ramp rate order for each of a plurality of designated converters as a function of the plurality of values so as to equalise a plurality of power ramp times for the plurality of designated converters, the power ramp time for each of the plurality of designated converters being the time taken for that designated converter to attain a predefined converter power.

6. A multi-terminal DC electrical network according to claim 4 wherein the solver is configured to use the algorithm to process the plurality of values to thereby compute a DC voltage ramp rate order for each of a plurality of designated converters as a function of the plurality of values so as to equalise a plurality of DC voltage ramp times for the plurality of designated converters, the DC voltage ramp time for each of the plurality of designated converters being the time taken for that designated converter to attain a predefined DC converter voltage.

7. A multi-terminal DC electrical network according to claim 1 wherein the solver is configured to use the algorithm to process the plurality of values to thereby compute a DC power transmission medium current for at least one designated DC power transmission medium, a converter current for the or each designated converter, a converter voltage for the or each designated converter, a converter power for the or each designated converter and/or a converter power error for the or each designated converter.

8. A multi-terminal DC electrical network according to claim 7 wherein the solver is configured to use the algorithm to process the plurality of values to thereby compute a DC power transmission medium current for the or each designated DC power transmission medium, a converter current for the or each designated converter, a converter voltage for the or each designated converter and/or a converter power error for the or each designated converter in accordance with a or a respective predefined limit.

9. A multi-terminal DC electrical network according to claim 7 wherein the solver is configured to use the algorithm to process the plurality of values to thereby sequentially compute at least two of: a DC power transmission medium current for the or each designated DC power transmission medium; a converter current for the or each designated converter; a converter voltage for the or each designated converter; a converter power for the or each designated converter; a converter power error for the or each designated converter.

10. A multi-terminal DC electrical network according to claim 1 wherein the solver is configured to use the algorithm to iteratively process the plurality of values.

11. A multi-terminal DC electrical network according to claim 8 wherein the solver is configured to use the algorithm to iteratively process the plurality of values to re-compute the DC power transmission medium current for the or each designated DC power transmission medium, the converter current for the or each designated converter, the converter voltage for the or each designated converter and/or the converter power error for the or each designated converter when the computed DC power transmission medium current, the computed converter current, the computed converter voltage and/or the computed converter power error for a prior iteration is not in accordance with the or the respective predefined limit.

12. A multi-terminal DC electrical network according to claim 10 wherein the solver is configured to use the algorithm to iteratively process the plurality of values to thereby compute a converter power error for the or each designated converter and to stop the iterative processing of the plurality of values when a difference between computed converter power errors of successive iterations is at or below a converter power error difference limit.

13. A multi-terminal DC electrical network according to claim 1 wherein the or each first value is defined by a value selected from a group including:
   a preliminary converter power order;
   a first operating state to configure the designated converter to constantly operate in a power control mode;
   a second operating state to configure the designated converter to operate in a power control mode and to switch from the power control mode to a DC voltage control mode after operating at a minimum or maximum DC voltage limit for a predefined period of time;
   a third operating state to configure the designated converter to constantly operate in a DC voltage control mode;

a converter droop characteristic, preferably a converter DC voltage-direct current droop characteristic;

a converter minimum power ramp rate.

14. A multi-terminal DC electrical network according to claim 1 wherein the or each second value is defined by a value selected from a group including:
   a base voltage value that is a rated voltage of the DC electrical network;
   a base current value that is calculated by dividing a rated power of the DC electrical network by a rated voltage of the DC electrical network;
   a base impedance value that is a rated impedance of the DC electrical network;
   a maximum number of iterations for processing the plurality of values;
   a load reference set point DC voltage;
   a converter current rating limit;
   a converter voltage rating limit;
   a DC power transmission medium current rating limit;
   an accuracy factor to control the computational accuracy of the algorithm, wherein the accuracy factor is defined by a converter power error limit or a power error difference limit;
   an algorithm acceleration factor to control the computational speed of the algorithm when iteratively processing the plurality of values;
   an optimisation toggle controllable to select whether or not the plurality of values is to be processed by the algorithm in accordance with one or more voltage or current rating limits;
   a DC power transmission medium impedance.

15. A multi-terminal DC electrical network according to claim 1 wherein the or each third value is defined by a value selected from a group including:
   a converter voltage;
   a converter current;
   a DC power transmission medium current.

16. A multi-terminal DC electrical network according to claim 1 wherein the controller is configured to perform an integrity validation of the integrity of the or each first value, and the solver is further configured to use the algorithm to process the plurality of values only if the integrity of the or each first value is validated by the integrity validation, wherein the or each first value has a valid integrity when one or more prerequisites are met.

17. A multi-terminal DC electrical network according to claim 13 wherein the or each first value has a valid integrity when:
   a representative matrix of the multi-terminal DC electrical network is square and has a non-zero determinant;
   the first value or at least one of the first values is defined by the second or third operating state;
   the or each preliminary converter power order for the or each designated converter is in the range of −1 and +1 per unit; and/or
   an or a respective operating state to configure the or each designated converter is defined by any of the first, second and third operating states.

18. A method of controlling power flow in a multi-terminal DC electrical network, the multi-terminal DC electrical network comprising:
   a plurality of DC terminals, each DC terminal being operatively connected to at least one other DC terminal via a respective DC power transmission medium; and
   a plurality of converters, each converter being operatively connected to a respective one of the DC terminals, the plurality of converters including at least one designated converter;
   wherein the method includes the steps of:
   (i) using an algorithm to process a plurality of values to thereby compute a no-load DC voltage for at least one first designated converter as a function of the plurality of values, the plurality of values including:
      at least one first value defining an operating mode of the or each designated converter;
      at least one second value defining a default electrical characteristic of the multi-terminal DC electrical network or a computation parameter of the algorithm; and
      at least one third value defining an electrical measurement corresponding to a voltage or current in the multi-terminal DC electrical network,
   (ii) operating the or each first designated converter in accordance with the or the respective computed no-load DC voltage.

* * * * *